United States Patent
Ambroziak et al.

(10) Patent No.: US 6,489,962 B1
(45) Date of Patent: Dec. 3, 2002

(54) ANALGLYPHIC REPRESENTATIONS OF IMAGE AND ELEVATION DATA

(76) Inventors: Russell Andrew Ambroziak, 7008 Cottontail Ct., Springfield, VA (US) 22153; Jeffrey Russell Ambroziak, 34 Temple Ct., New Haven, CT (US) 06511

( * ) Notice: Subject to any disclaimer, the term of this patent is extended or adjusted under 35 U.S.C. 154(b) by 0 days.

(21) Appl. No.: 09/348,597

(22) Filed: Jul. 6, 1999

Related U.S. Application Data (60) Provisional application No. 60/092,069, filed on Jul. 8, 1998.

(51) Int. Cl.$^7$ ................................................. G06T 15/10
(52) U.S. Cl. ........................................ 345/427; 345/8
(58) Field of Search .......................... 345/7–9, 87, 89, 345/147, 139, 419, 422, 435, 150, 153, 420, 423, 424, 427, 428; 348/42, 51; 382/154

(56) References Cited

U.S. PATENT DOCUMENTS

| 4,737,921 A | * | 4/1988 | Goldwasser et al. | 345/421 |
| 5,917,940 A | * | 6/1999 | Okajima et al. | 382/173 |
| 5,933,127 A | * | 8/1999 | Dubois | 345/87 |
| 5,977,979 A | * | 11/1999 | Clough et al. | 345/422 |
| 6,005,607 A | * | 12/1999 | Uomori et al. | 348/42 |

* cited by examiner

Primary Examiner—Steven Saras
Assistant Examiner—Amr Awad
(74) Attorney, Agent, or Firm—Bachman & LaPointe, P.C.

(57) ABSTRACT

An anaglyph of an image, the anaglyph comprising a plurality of a anaglyph pixels, each of the anaglyph pixels having an intensity of a first hue and an intensity of an orthogonal second hue wherein when viewed with apparatus which admits the first hue only to a viewer's right eye and admits the second hue only to the viewer's left eye, the image is perceived to be three-dimensional with each pixel in the image projected from an associate vantage point unique to such pixel.

16 Claims, 2 Drawing Sheets

ANALGLYPHIC REPRESENTATIONS OF IMAGE AND ELEVATION DATA

CROSS-REFERENCE TO RELATED APPLICATION

Priority is claimed of U.S. provisional patent application No. 60/092,069, entitled "Process for Producing and Product Composed of Anaglyphic Representations of Image and Elevation Data" filed Jul. 8, 1998.

BACKGROUND OF THE INVENTION (1) Field of the Invention

This invention relates to the fields of digital image processing and more particularly to the creation and presentation of three-dimensional (3-D) images on a two dimensional viewing surface.

(2) Description of the Related Art

Since the invention of the stereoscope in the mid 1800s, there have been many successful attempts to make full use of human binocular vision's ability to combine two separate images, one each obtained by each eye viewing the same scene from slightly different angles, into one image which is perceived as having depth. The mechanics by which the human brain combines two flat images into one image producing the sensation of a three dimensional world is not fully understood. However, many techniques have been developed which deliver, by way of differing processes, slightly different two dimensional images to each eye so as to produce in the brain a perception indistinguishable from that obtained by actually viewing the three dimensional world. These techniques belong generally to two major classes, specifically the autostereoscopic imaging class which produces 3-D images viewable by the unaided eye, and the binocular stereoscopic imaging class which produces 3-D images requiring observers to wear spectacles or viewers. Techniques of the later class can be found in 3-D movies of the 1950s and in recent images returned from the surface of Mars.

Early stereoscopes commonly utilized a specialized device into which was inserted an image comprised of two nearly identical but separate images reproduced side-by-side. Each separate image was created by photographing a scene from one of two slightly different angles. When viewed through the stereoscope, each eye was constrained so as to see only one of the images and the perception of three dimensions was achieved. While this sort of stereoscope does allow for each separate image to be viewed in color and with minimal distortion of the original scene, it possesses the drawback of requiring apparatus to properly constrain each eye's field of vision and, by so doing, the ability of the viewer to move closer or further, up or down, right or left about the image is severely restricted. Anaglyphs, while generally restricting the creation of 3-D images to those comprised of varying shades of gray, provide the advantage of requiring less obtrusive apparatus for viewing, consist of only one image to be viewed as opposed to two images placed side by side, and allow the viewer to move freely about the image.

An anaglyph is defined as a composite picture printed in two colors that produces a three-dimensional image when viewed through spectacles having lenses of corresponding colors. The best results are obtained when the colors (or, more precisely, hues) used to produce the anaglyph represent orthogonal hues. That is to say, a change in the intensity of one of the hues present at any point on the image does not affect the intensity of the other hue. One typical choice of hues used to produce anaglyphs is that of red and cyan. When a red image is combined with a slightly different cyan image and viewed through glasses having one lens filtering out all but the cyan light and the other lens filtering out all but the red light, the perception of 3-D is accomplished. Because the filters allow only light of one particular wavelength to pass through, the anaglyph is effectively split into two images with each eye seeing a scene depicting the original scene as viewed from one of two slightly different angles.

Barring occlusion, each picture element (hereinafter "pixel") is represented twice in the anaglyph, once in cyan and once in red. The horizontal distance separating the two pixels of differing hue, each of which represents the same pixel in the original image, determines the extent to which the pixel appears in front of or behind the image plane. The "image plane" is defined as the plane containing the paper or other medium upon which the anaglyph is displayed. A pixel which rests in three dimensions upon the image plane is unique in that both its red and cyan representations occur at the exact same spot on the anaglyph and, hence, appear to rest in three dimensions upon the image plane. The greater the distance separating the red and cyan representations of a pixel in an anaglyph, the greater the distance the pixel appears to rest in 3-D either above or below the image plane.

Historically, the most common method of producing both stereograms and anaglyphs has been photographic in nature. In such instances, the separate images used to comprise the stereogram or anaglyph are captured photographically. Early 3-D stereograms of cityscapes and anaglyphic movies were created by utilizing two cameras separated by a distance, aimed in the same direction, and operated simultaneously. More recently, satellite images have been used to form stereograms. For instance, stereograms have been assembled from images in the overlap region of two geostationary satellites. With the proliferation of computer technology, it is now possible to describe mathematically, in a computer, objects which need not exist in the natural world, generate realistic two dimensional views from slightly different angles, and combine the views to form stereograms and anaglyphs.

While creation of 3-D images on a computer allows for complete control over the components of the final image, computer-generated 3-D images require considerably more expertise and information to create than do their photographic forbears. One need simply open one's eyes or point two cameras in any direction to obtain two scenes from slightly different angles. It is not necessary for the perception of depth to acquire a detailed mathematical description of any one object's relative distance let alone the exact positioning in three dimensions of every single point, comprising every single surface, of every single object which is visible to the observer. In contrast, the creation of a computer generated stereogram or anaglyph does require such detailed information.

While photographic and computer generated anaglyphs differ in the manner by which they are created, the results obtained by either method are quite similar in many important respects. Most importantly, both methods seek to provide each of the viewer's eyes with a scene that is substantially similar to that which would be observed were the observer to look with unaided vision from a particular vantage point at his surroundings. Photographic anaglyphs produce the sensation of viewing a three dimensional landscape from the vantage point at which the cameras were situated. Computer generated anaglyphs, while able to choose any hypothetical vantage point from which to create the necessary images, must choose only one vantage point.

The restriction imposed by choosing one vantage point imposes both advantages and disadvantages. One primary advantage is that the perception of a three dimensional scene is virtually free of distortion. By mimicking that which the unaided eye would normally observe, the anaglyph produces a sensation quite similar to that produced by natural binocular vision. As discussed, early stereoscopes were comprised of apparatus which constrained the motion of the observer around the image. Early 3-D anaglyphic movies required all observers to be seated some distance from the screen and hence constrained all viewers to a viewing angle approximately perpendicular to the image plane. While producing a quite realistic three dimensional sensation, such applications of 3-D technology have remained interesting gimmicks with little wide spread application.

One primary reason for the limited application of anaglyph technology has been the general requirement that the 3-D image be viewed from a single point approximating the location from which the anaglyph was photographed or from which it was computed. The sensation of 3-D produced when viewing the real world is most pronounced when objects are viewed from a relatively small distance. When viewing far away hills, or even the far side of a room, the brain relies much more on visual cues such as shading, texture, and occlusion to interpret depth information. This reliance on visual cues, separate from that which is strictly binocular in nature, is the result of variations in viewing angles. For example, the amount that each eye must deflect from a parallel orientation fixed on infinity to view a spoon held mere inches from one's face is quite severe. In addition, the difference between such an angle of deflection and one produced when viewing the same spoon held at arm's length is likewise quite large. Contrast this with difference in angle existing when viewing a hill that is one mile away and a star which is several hundred million miles away. In the latter instance, the relative difference in viewing angles is quite slight.

Therefore, anaglyphs produced from a single vantage point enjoy their greatest utility when presenting objects that are relatively close to the observer. Unfortunately, such anaglyphs are constrained to a relatively small field of view. Were one to stare off center or at the periphery of an anaglyph, as opposed to a viewing angle perpendicular to the image plane, the image appears greatly distorted. Therefore, an unfortunate paradox arises. Anaglyphs of far away objects allow for a greater field of view and appear less distorted when viewed from slightly different angles but the 3-D effect is diminished from the outset owing to the large distance between the objects and the viewer. Conversely, objects close to the viewer appear in very realistic 3-D but the field of view is diminished greatly and even slight movements about the anaglyph result in large distortions.

One subset of three dimensional objects that in theory would benefit most from the advantages of traditional anaglyph technology while suffering most from its disadvantages is the set consisting of planetary surfaces. Traditionally, such surfaces have been portrayed in two dimensions in the familiar guise of maps. In addition, planetary surfaces have for some time been recreated in true three dimensional form as globes, but suffer from problems related to the inability to store, reproduce, transmit, and conveniently bundle a spherical object in the same manner as one can a flat image. Furthermore, as the Encyclopedia Americana observes, "The spherical surface of a globe cannot be flattened into a map without stretching or tearing; therefore, distortion occurs in the process." This simple premise, long considered to be an unavoidable fact, has given rise to myriad map projections over the millennia. Map projections such as the mercator, plate carée, and others all seek to derive maximum utility when displaying map data while minimizing the inevitable distortion.

While different projections address differently the problems of longitudinal and latitudinal distortion, they do not generally make any attempt to incorporate elevation data. Much as the human eye can gather depth information from visual cues, many maps incorporate colors, shaded relief, and contour lines of equal elevation to transmit course elevation data. Shaded relief illustrates the roughness of terrain and changes in elevation but cannot show actual elevation. Contour lines can show the horizontal shape of vertical features and the elevation values of the quantized contour lines, but do not show the actual vertical shape. However, to see the actual shape of a planetary surface, some method of displaying the surface in true 3-D is required.

The related art in anaglyph production allows one to overcome the problems of distortion associated with flattening a spherical globe onto a two dimensional map. It is quite possible to compute two slightly different views of a spherical surface as they would appear to an unaided observer. However, such an anaglyph, while accurately representing the three dimensional surface of a planet with little or no distortion, would be of relatively less use as a map. As discussed, one primary drawback of a traditional anaglyph is the necessity of viewing the final image from one and only one vantage point, the point in space from which the original images were photographed or computed. Maps are customarily viewed from a variety of vantage points. Large scale political maps may be viewed from a greater distance so as to observe relatively large land masses, boundaries, and the interplay of point, line, and area data. Before battle, Napoleon customarily placed his maps on the floor, alternatingly standing above them and crawling over them. Were a traditional anaglyph used to produce a map in accordance with the related art, such movement by the observer would be impossible. Because the map would be projected and computed as seen from a singular vantage point, movement by the viewer away from the intended viewing point in space would cause gross distortion.

A partial solution to these problems prevalent in the anaglyphic display of map data was revealed in an article by W. Pichel [Bulletin of the American Meteorological Society, Vol. 54, No. 7, July 1973, pp. 688–691]. Pichel created an algorithm for creating stereo pair images from satellite images one of which was comprised of the visible spectrum, the other containing infrared (IR) data. On a line-by-line basis, the IR data was used as a pseudo height indicator for each corresponding pixel in the visible image. As Pichel explained:

Thus a simple computer algorithm treats coincident scan lines of visual channel data and the equivalent IR data that have been transformed into a scan profile of height levels. The output is a visual channel stereo line pair in which the visual data are displayed with no change in position for elements at zero height level, but in which elements at other levels are shifted in position. A picture element with height level "h" is displaced from its original position by "h" spots to the right in the left stereo view and "h" spots to the left in the right stereo view . . .

A dilemma is encountered where two picture elements are competing for the same location. At present the higher element is retained and the lower element is discarded. In other instances gaps may exist after the displacement process is completed.

While producing pleasing images which, if georeferenced, could be considered as maps, this methodology suffers from four drawbacks. First, elevations appear relatively correct but absolutely incorrect. Clouds of lower temperature, and hence higher elevation, will appear more displaced than clouds of higher temperature and will thus appear to be at a higher elevation everywhere on the map. However, the apparent difference in elevation between a pixel at level five and a pixel at level ten will not appear to be the same difference in elevation as between a pixel at level ten and a pixel at level fifteen. In each case, the difference in elevation is five units but the simple algorithm of pixel displacement employed produces nonlinear viewing effects. This concern is minimized when one considers that the underlying elevation data is itself not considered to be absolutely correct as the relationship between elevation and temperature in the atmosphere is not perfectly linear. Therefore, the elevation levels computed were accepted as rough estimates from the outset.

Second, the creation of a stereogram produces two images side by side. As such, the same pixel appearing in each image is separated on average by the approximate width of either image. Therefore, either with special viewing apparatus or without, the ability of the observer to move around the image is curtailed. Third, this simple algorithm, by displacing all of the pixels in either computed image either all to the left or all to the right, features appear either uniformly in front of or behind the image plane. Thus, a map computed using this algorithm could not have both mountains rising from the image plane and canyons descending beneath it. The entire surface would have to appear either entirely below or entirely above the image plane.

The fourth and most difficult problem to overcome is the likely presence of gaps resulting from the displacement process. The simplest algorithms for reprojecting image data involve mapping each pixel on the original image to a location on the final image. A simple forward looking algorithm such as the one presented above possesses the attribute of being very simple and fast to implement. Unfortunately, because several pixels in the original image may map to the same location in the final image, there are likely to exist gaps in the final image consisting of pixel locations onto which no pixels were mapped. In such cases, smoothing algorithms can be employed which produce values for the missing pixels while masking the loss of data that produced the problem. The alternative, constructing a process hereby every pixel in the final image is assigned a value ascertained by working backwards t o determine which pixel at what elevation in the original image would ultimately appear to exist at the location being considered, can be prohibitively costly in terms of both complexity and computing speed.

Interestingly, in such a process, each pixel is projected in accordance with its own unique vantage point. Thus, instead of using a single vantage point for the entire image, there exist as many vantage points as there are pixel s in the original image. As mentioned, one advantage of having a single vantage point for viewing a stereoscopic or anaglyphic image is that, when viewed from that point, there is virtually no distortion present over the entire image. Following the method described above, displacement of each pixel is computed without any regard to a single vantage point governing the projection of the image as a whole. Such a method possesses unique properties when employed to render maps.

A single point represented by horizontally displaced red and cyan points computed and viewed from directly above will not produce either latitudinal or longitudinal distortion. Any distortion present must arise from the difference between the angle at which the observer views the red and cyan and pixels and nadir. Therefore, pixels appearing immediately horizontally or vertically adjacent to the point directly in front of the observer will appear slightly distorted. Distortion increases as the observer's gaze extends radially from nadir. Because distortion is directly proportional to the radial aperture of the area being viewed by the observer, relatively small areas will appear to be virtually free of distortion. In order to view larger areas, the observer must move backwards to increase the field of view. In so doing, the maximum angular distortion present in the larger field of view is reduced to a threshold approximating that of the smaller area viewed from a closer vantage point. This results from the fact that viewing a larger area from the same distance as a smaller area requires a greater deflection of the viewing angle. However, the angle of deflection is proportional to the viewing distance and thus the viewer may move back, decreasing the deflection of the viewing angle to that experienced closer in.

BRIEF SUMMARY OF THE INVENTION

The present invention seeks to maximize the utility derived from projecting map data using multiple vantage points while minimizing or eliminating the obstacles present in the related art. As mentioned, traditional anaglyphic techniques utilizing one vantage point permit viewing of the image from one point with virtually no distortion, but result in large amounts of distortion when the viewer moves even slightly around the image. The present invention projects each pixel individually. One notable difference between the present invention and the related art is that while each pixel is projected from a different vantage point, each pixel is projected as though viewed from directly above by an observer who is everywhere located the same distance above the image and whose eyes are separated everywhere by the same distance. The related art, by virtue of its simple, non-linear computation of displacement, and hence perceived elevation, computed each point a having either a different viewing distance, a different eye separation, or both with the result that the vertical scale is not everywhere constant.

The advantages of such a projection used to produce 3-D maps are many. The most evident advantage is the ability of the viewer to move up and down, backwards and forwards, and right and left about the map without the perception of overwhelming distortion. Because the map appears distortion free from no one place but, rather, contains very little distortion everywhere, when areas are viewed from a distance proportional to their size, the map may be scrutinized anywhere on its surface from up close or from a distance without the introduction of appreciable distortion. In addition, the vertical exaggeration appears as "self scaling." For example, if the vertical exaggeration is computed to be three times that of actual when viewed at a distance of twelve inches, the vertical exaggeration appears to be six times that of the original when viewed at a distance of twenty-four inches. Therefore, vertical exaggeration is made more pronounced, and hence more noticeable, when the viewer moves further away. Likewise, vertical exaggeration is made less pronounced as the viewer moves in to scrutinize a small area. Such scaling is necessary in the later case to avoid eye strain.

The present invention used for determining the displacement distance of the red and cyan pixels, while computationally complex, produces an image in which perceived pixel elevations are both relatively and absolutely correct. By incorporating the image to be projected into 3-D with a digital elevation model (DEM) which contains or from which can be computed the actual elevation of each pixel in the image, the resulting image accurately represents each pixel at its correct elevation in 3-D. For example, the perception of a mountain rising 1000 meters from the image plane would appear to rise a height equal in elevation to the depth that a canyon cutting 1000 meters into the image plane would appear to descend. As is clear from this example, the present invention, by incorporating a more sophisticated projection algorithm than the prior art, allows for the rendering in the same 3-D image of features which both rise above the image plane, and which descend below it.

In addition, the present invention makes use of a computationally intensive algorithm for determining the location of each red and cyan pixel in the final anaglyph. As mentioned, forward looking algorithms, while simple to implement, often leave gaps in the final image representing losses of data which must be filled. The present invention computes both the red and cyan finished images by considering each pixel in the final images and working backwards to determine which pixel in the original image, draped over the corresponding DEM, and viewed from the appropriate vantage point, would appear as resting at the final location being considered. While considerably more difficult to implement than a forward looking algorithm, the results produced by the present method result in a finished image free from data loss and which do not require smoothing.

In addition, the related art gives no indication of a desire or an ability to produce a composite anaglyph consisting of different images each with a unique DEM. The current implementation allows finished anaglyphs to be combined with additional point, line, area, or image data plotted in varying intensities and constructed from DEMs differing from that of the main image. This ability allows one, for instance, to display mountains in 3-D while making visible, below a planet's surface, the layout of subterranean coal mines. Similarly, flight paths can be displayed in 3-D overlaid atop the terrain over which the plane will travel. An additional benefit of computing anaglyphs from image and DEM data, as opposed to. the traditional photographic method, is the ability to digitally master the images used to create the anaglyph. For example, digital data such as the contours of geological rock strata may be overlaid on top of satellite data and presented in true 3-D. The resultant anaglyph allows the viewer to vividly perceive the different angles at which rock strata rest and interact with geologic forces.

The present invention is not limited to map data. Each data element of a map occupies a unique position in two dimensions as specified by its latitude and longitude attributes. In addition, the corresponding DEM is comprised of elevations representing deviations from a point of zero elevation (which on earth is usually chosen to be sea level). However, the present invention can be applied to any image each pixel of which possesses a unique position in two dimensions. For example, the x and y image pixel locations of each pixel comprising a CAT scan could be combined with elevation data corresponding to the y displacement of each pixel from a chosen baseline to produce a 3-D image of a body structure.

In addition, the present invention is not limited to an anaglyphic mode of presentation. Left and right views of a full color image may be computed using the algorithm of the present invention and displayed in alternating and near simultaneous fashion to opposing eyes so as to produce the sensation of binocular tree-dimensionality.

Accordingly, one aspect of the invention is directed to a method of combining digital image data with digital elevation data to produce two separate images said separate images, when viewed one with the left eye and the other with the right eye, producing the sensation of binocular three-dimensionality, comprising the steps of:

(a) combining said digital image data with said digital elevation data to create a right eye view image with each pixel in said right eye view image corresponding to the pixel in said digital image data which would appear in three dimensions to reside at the location of said right eye view image pixel were each of said digital image data pixels to reside upon the surface defined by said digital elevation data, observed individually directly from above, from a uniform height and eye separation, projected upon a plane of uniform height;

(b) combining said digital image data with said digital elevation data to create a left eye view image with each pixel in said left eye view image corresponding to the pixel in said digital image data which would appear in three dimensions to reside at the location of said left eye view image pixel were each of said digital image data pixels to reside upon the surface defined by said digital elevation data, observed individually directly from above, from said uniform height and eye separation, and projected upon said plane of uniform height; and (c) displaying said left eye view image and said right eye view image so as to produce the sensation of binocular three-dimensionality.

Another aspect of the invention is directed to the aforementioned method wherein said left eye view image and said right eye view image are not each comprised of a representation of each individual pixel present in said digital image data arising from the effects of occlusion of said pixels when said digital image data is viewed in combination with said digital elevation data.

Yet another aspect of the invention is directed to the aforementioned method wherein the digital image data is preprocessed into a gray image each pixel of which contains equal amounts of red, blue and green, said gray image being subsequently combined with said digital elevation to create and display said left eye view image and said right eye view image.

Still another aspect of the invention is directed to the aforementioned method wherein an anaglyph is formed from said left eye view image and said right eye view image comprising the steps of:

(a) assigning each pixel in said left eye view image a single hue;

(b) assigning each pixel in said right eye view image a single hue which is orthogonal to said single hue assigned to each pixel in said left eye view image; and (c) assigning each pixel in said anaglyph the sum of the red, blue, and green values present in each corresponding pixel from both the left eye view image and the right eye view image.

Yet another aspect of the invention is directed to the aforementioned method wherein said single orthogonal hues consist of the pairs red and cyan, green and blue, and red and blue..

Yet another aspect of the invention is directed to the aforementioned method wherein said left eye view images and said right eye view images are displayed on a surface in a manner comprising the steps of:

(a) displaying said left eye view image on the surface in a manner so as to be perceivable by only the viewer's left eye;

(b) displaying said right eye view image on the surface in rapid succession with (a) in a manner so as to be perceivable by only the viewer's right eye; and (c) continuously repeating in an alternating fashion steps (a) and (b).

Another aspect of the invention is directed to the aforementioned method wherein each of said left eye view images is comprised of multiple separate left eye view images and each of said right eye view images is comprised of multiple separate right eye view images combined in a manner comprising the steps of:

(a) computing multiple separate said left and right eye view images each covering an area which intersects in whole or in part with that of at least one other separate said left or right view image;

(b) assigning a multiplier between 0 and 1 to each separate said left or right eye view image corresponding to the desired opacity of each separate said view image;

(c) applying the corresponding multiplier to each pixel of each of said separate view images; and (d) adding each corresponding pixel value from each separate left or right view image to form one each of final said left and right eye view images.

Yet another aspect of the invention is directed to the immediately preceding aspect wherein each of said left and right view images are perceived as consisting of multiple layers of three-dimensional images, each of said layers being partially, fully, or not at all transparent with respect to other said layers of three-dimensional images.

Yet another aspect of the invention is directed to the aforementioned method wherein each row of the right eye view image is created by projecting a single row of said digital image data in conjunction with a single row of said digital elevation data while proceeding from left to right across said row of digital elevation data.

Yet another aspect of the invention is directed to the aforementioned method wherein each row of the left eye view image is created by projecting a single row of said digital image data in conjunction with a single row of said digital elevation data while proceeding from right to left across said row of digital elevation data.

Yet another aspect of the invention is directed to the aforementioned method wherein said digital elevation data is comprised of at least two values which differ in magnitude.

An additional aspect of the invention is directed to an image comprising a plurality of pixels each of said pixels having an intensity of a first hue and an intensity of an orthogonal second hue wherein when viewed with apparatus which admits the first hue to a viewer's right eye and admits the second hue to the viewer's left eye, the image is perceived to be three-dimensional with each of said pixels projected as though viewed from directly above, with a uniform eye separation, and a uniform height.

The details of one or more embodiments of the invention are set forth in the accompanying drawings and the description below. Other features, objects, and advantages of the invention will be apparent from the description and drawings, and from the claims.

DETAILED DESCRIPTION

Creation of anaglyphs possessing the requisite properties detailed within require the following steps:

First, image data and digital elevation data are collected and converted to digital form on a computer. If the image data is geographic in nature, it is geo-referenced so that each image pixel possesses a unique latitude and longitude attribute. This geo-referenced image data may then be projected in accordance with any desired geographic projection. Once projected, the image data is cropped into a rectangular format containing an integer number of rows and columns. Pixels comprising image data derived from non-geographic sources including, but not limited to, CAT scans, may be attributed by screen coordinates. Every picture element, or pixel, comprising the image data can be uniquely identified by its row and column attribute. While a multitude of conventions may be adopted for locating a pixel in the image data, one preferred method which forms the basis for subsequent discussion herein is to assign the upper-left most pixel the row/column designation (0,0). In an image comprised of x columns and y rows of data, the lower right-most pixel is designated (y,x), the upper right-most pixel is designated (0,x), and the lower left-most pixel is designated (y,0).

In a similar manner, the digital elevation data corresponding to the area covered by the image data is attributed such that each digital elevation datum possesses a unique screen coordinate. To avoid the presence of gaps in the final image, it is desirable that the image data be comprised of a number of pixels equal in magnitude to the number of columns (x) multiplied by the number of rows (y). It is neither necessary nor common for there to exist as many digital elevation values as there exist image pixels. Because digital elevation models typically consist of elevation values sampled at discreet intervals, numerous image pixels can and typically will reside between corresponding digital elevation values.

The image is then converted to a gray image in which each pixel contains a value defining its intensity with each pixel being of identical hue and saturation. The number of levels utilized is dependent upon the byte representation of the computer used. For example, if a graphic format is used to store the final image which uses one byte per pixel, only 256 combinations of red, green, and blue are available from the file format's look-up table. Because the image must ultimately contain two overlaid similar images, one rendered in red, the other in cyan, the number of possible combinations of every possible level of red and cyan must not exceed 256 (a one byte integer can represent the numbers 0–255). Therefore, each image should be reduced to a gray image by assigning each pixel the intensity nearest to it on a scale of 1 to 256 divided into 15 possible levels. With each pixel having one of 15 possible levels, combinations involving 2 such pixels, as on the final image, can have at most 15 squared, or 225 final possible values. This number is well within the limit of 256. Two, three, or even four byte representations may utilize gray images which vastly enhanced precision regarding the levels of gray corresponding the intensities of the original image. One preferred method for defining the intensity of a pixel in a color image so as to translate the color image into one consisting of intensities of gray is to adopt the standard methodology incorporated in the JPEG compression algorithm. In addition, if the method to be utilized to view the results of the projection algorithm articulated herein is other than anaglyphic in nature, the image data may be left in a format capable of representing a multitude of hues.

Figure 2:
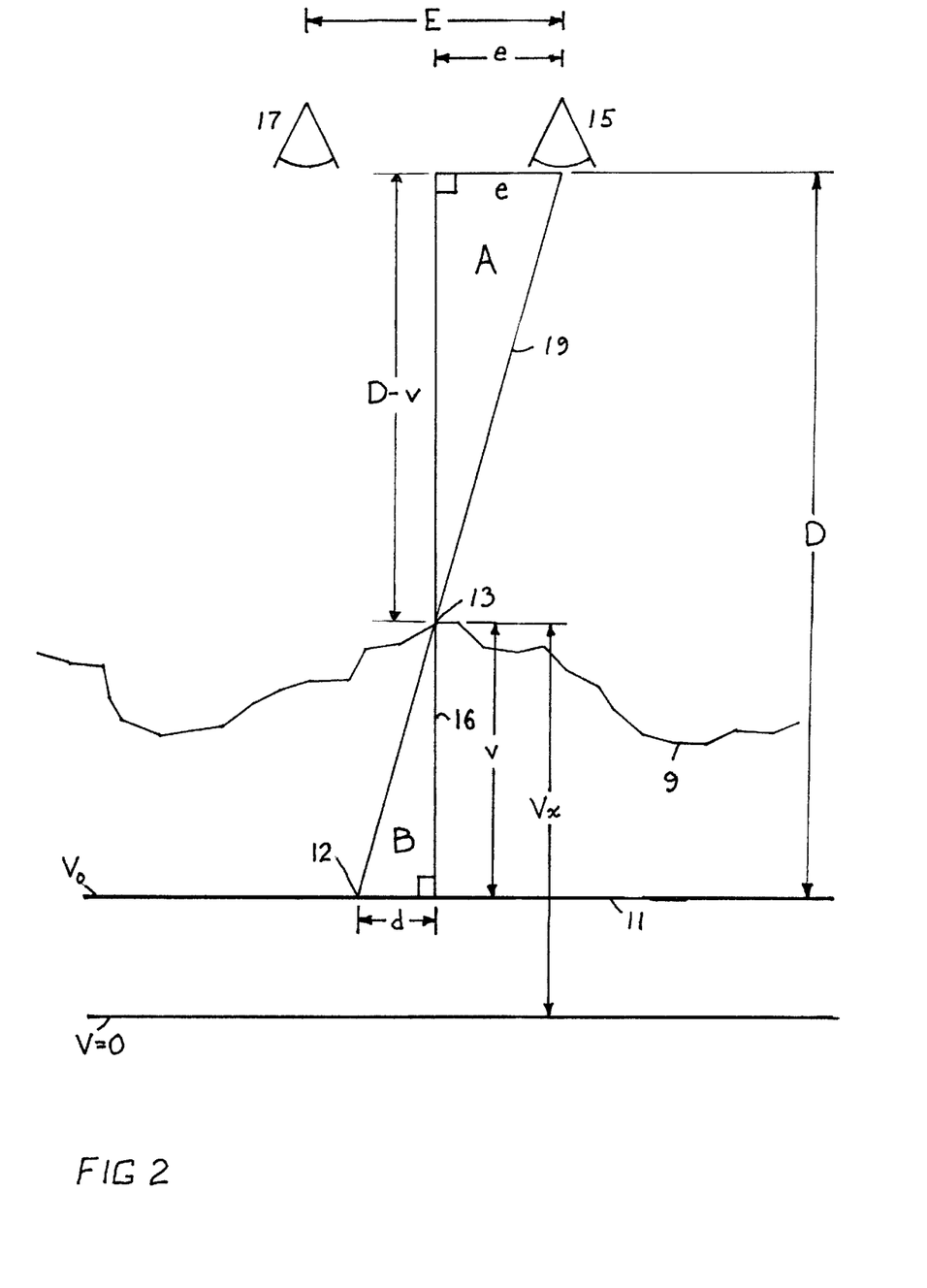
FIG. 2 is a schematic cross-sectional view of a single row of digital elevation data illustrative of the variables and parameters which define the operation of the algorithm employed to create the three-dimensional data projection.

Next, two nearly identical images are created. The images respectively replicate what the viewer would see through the right and the left eyes after applying the projection algorithm described herein. While FIG. 2 details the algorithm as it pertains to the creation of the image representing the right eye view (hereinafter the "right view"), it will thereafter be obvious to one skilled in the art how to apply the algorithm so as to create the image representing the left eye view (hereinafter the "left view"). With reference to FIG. 2, the algorithm employed to create the two images proceeds as follows. The first row of elevation data is retrieved. As mentioned, each row of image data preferably contains as many pixel values as there are columns in the image. Because, for each row of digital elevation data there are typically fewer digital elevation values than there are columns, digital elevation values are typically spread out across the row with gaps signifying missing elevation data spanning the distances in between. Were each point of elevation to possess the same elevation value and be located at the same elevation as the image plane (the plane representing the medium upon which the final image is to be printed or displayed) a viewer viewing each point of digital elevation from directly above the point would perceive the point to rest in exact conformity with its location within the row of data. For instance, a digital elevation value located twenty columns from the left-most edge of the image would appear to reside twenty pixels from the left-most edge of the image. As is evident from FIG. 2, when the digital elevation cross section 9 differs in elevation from that of the image plane 11, the perceived location 12 of each digital elevation point 13 as viewed from the right eye 15 of the viewer is deflected by a distance d from its original position to a new location within the retrieved row of elevation data.

With respect to FIG. 2, the perceived deflection distance d is computed as follows. E represents the distance between the observer's eyes. For convenience, this value is set at 2.75 inches but may be any other desired value which approximates the desired viewer eye separation. One-half E, or e, is the distance between nadir 16 and the right eye 15. D represents the distance from the image plane 11 to the viewer's eyes 15, 17. The difference in elevation between a digital elevation point 13 and the image plane 11 is denoted by v. $V_0$ represents the elevation of the image plane 11. V equals the elevation of each digital elevation point 13 measured from where V equals 0, which for land on earth is mean sea level, for water depth is mean high tide, and for non-geographic subject matter is a chosen point of reference from which to measure the elevation of the digital elevation points 13. The deflection of the digital elevation point 13 is denoted by d and is identical in magnitude for both the right eye 15 and the left eye 17 with only the sign (direction) of the deflection being reversed. The vertical exaggeration of the digital elevation data is denoted by x. In order to compute d for each digital elevation point 13, it is necessary to know the four constant values E, $V_0$, D, and x. As mentioned, E is set at 2.75 inches while $V_0$, D, and x are chosen so as to create a final image of desired characteristics. For example, if a canyon is to be processed with an outer rim elevation of approximately 5,000 meters, $V_0$ may be set at 5,000 meters so that the canyon will appear to recede behind the image plane 11. Conversely, $V_0$ may be set to the approximate height of the base of a range of mountains so that the mountains appear to rise out of and in front of the image plane 11. D is typically set to a value between twelve and twenty-four inches but may be set to any appropriate value conducive to the desired effect of three-dimensional relief. Lastly, the vertical exaggeration x is chosen to provide the desired effect of three-dimensional relief. Often, it is advantageous to exaggerate the elevations of relatively flat digital elevation sets so as to enhance the resultant three-dimensional effect.

As the value V is known for each digital elevation point 13, the value of d is readily computed. Because triangles A and B are similar right triangles the following relationships must hold true:

$$d/v = e/(D-v)$$

and $$d = ve/(D-v) \text{ where } v = Vx - V_0.$$

It is therefore possible to compute the deflection d for each digital elevation point 13.

Figures 1, 1A, 1B, 1C:
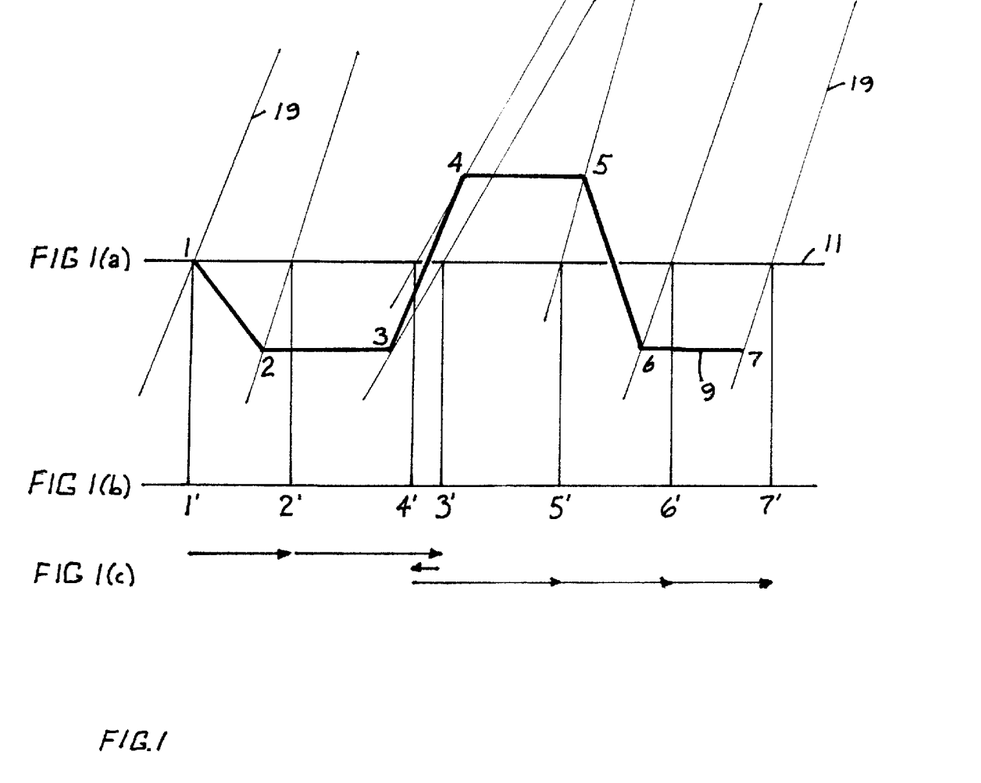
FIG. 1 is a schematic representation of a cross section of digital elevation data illustrative of the algorithm employed to create the three-dimensional data projection.

To illustrate the incorporation of the derivation of d into the algorithm for producing the left and right views, reference is made to FIG. 1. Each pixel in the right view image is computed from the gray image in the following manner. Moving down the gray image row by row, the corresponding digital elevation cross section 9 is retrieved. Depending upon the spacing of the digital elevation data, it is probable that some rows of the digital elevation data will contain no data values. To generate the required points of data for each row, the original grid of digital elevation points is interpolated in both the x and y directions as is necessary. While linear interpolation is preferred, numerous interpolation techniques are known in the art. As mentioned, because there are usually fewer elevation points per row than image pixels, multiple image pixels will be plotted between known points of elevation. Proceeding across the first row from left to right, the position of each digital elevation point 1–7 is moved to the left or to the right in the digital elevation data row according to its computed deflection d. As previously detailed in FIG. 2, this displacement is computed by passing an imaginary ray from the right eye of the viewer, through the digital elevation point 1–7, and across the image plane 11. The rays' intersections with the image plane 11 determine the new locations of the digital elevation points 1–7 along the corresponding right view image row denoted by 1'–7' as shown in FIG. 1(b). Because the digital elevation points 1'–7' used to create the right view are derived by ascertaining their corresponding digital elevation points 1–7 of origin in the original retrieved row of digital elevation data, the algorithm employed herein is said to be "backwards looking" in nature. As is evident from FIG. 1, digital elevation points 2,3,6,7 residing below the image plane are deflected to the right. Digital elevation points 4,5 residing above the image plane are deflected to the left. Note that digital elevation point 1 which rests at an elevation equal to that of the image plane is not deflected at all.

Next, the portion of the corresponding image data row extending between any two consecutive points on the original row of digital elevation data is replotted on the corresponding row of the right view image utilizing the displaced and deflected digital elevation points 1'–7'. For example, in FIG. 1(c), the original image pixels extending along the retrieved row from point 1 to that of point 2 are stretched slightly to extend from 1' to 2' in the right view image row. This process continues from 2 to 3, from 3 to 4, and so on. Note that portions of the original image are overwritten in the new right view image as happens when the 4' to 5' segment overwrites the 3' to 4' segment and part of the 2' to 3' segment. This results from these sections being occluded when viewed in 3-D. This process is repeated for every row. The left view image is computed in a similar manner for the left eye except the algorithm is employed row by row with each row being computed by moving from right to left.

Next, the two computed images are aligned and added together to form a final anaglyph. If the final image is to be an anaglyph, the image intensities comprising the right view image and the left view image are assigned orthogonal hues. Most preferred is to assign all pixels in the right view image an intensity of red and to assign all pixels in the left view image an intensity of cyan (equal amounts blue and green). When the two images are aligned atop one another and the pixel values for the final anaglyph are computed, the amount of red required at each pixel in the final image is equal to the red value of the corresponding right view image pixel and the amount of cyan required at each pixel in the final image is equal to the cyan value of the corresponding left view image pixel. At this point, additional image data and DEMs may be combined to form other anaglyphs corresponding to the same area as the final image and the results may mixed with the first anaglyph at any desired level of opacity. Many algorithms for combining images at varying degrees of opacity will become obvious to one skilled in the art.

One or more embodiments of the present invention have been described. Nevertheless, it will be understood that various modifications may be made without departing from the spirit and scope of the invention. Accordingly, other embodiments are within the scope of the following claims.

What is claimed is:

1. A method of combining digital image data with digital elevation data to produce two separate images said separate images, when viewed one with the left eye and the other with the right eye, producing the sensation of binocular three-dimensionality, comprising the steps of:
    (a) combining said digital image data with said digital elevation data to compute a right eye view image with each pixel in said right eye view image corresponding to the pixel in said digital image data which would appear in three dimensions to reside at the location of said right eye view image pixel were each of said digital image data pixels to reside upon the surface defined by said digital elevation data each of said pixels in said Tight eye view image computed from a vantage point directly above and unique to the corresponding pixel in the digital image data;
    (b) combining said digital image data with said digital elevation data to compute a left eye view image with each pixel in said left eye view image corresponding to the pixel in said digital image data which would appear in three dimensions to reside at the location of said left eye view image pixel were each of said digital image data pixels to reside upon the surface defined by said digital elevation data each of said pixels in said left eye view image computed from a vantage point directly above and unique to the corresponding pixel in the digital image data; and
    (c) displaying said left eye view image and said right eye view image so as to produce the sensation of binocular three-dimensionality.

2. The method of claim 1 wherein each of said vantage points is located at a uniform height.

3. The method of claim 2, wherein said left eye view image and said right eye view image are not each comprised of a representation of every pixel in said digital image data arising from the effects of an occlusion when said digital image data is viewed in combination with said digital elevation data.

4. The method of claim 2, wherein the digital image data is preprocessed into a gray image each pixel of which contains equal amounts of red, blue and green, said gray image being subsequently combined with said digital elevation data to create and display said left eye view image and said right eye view image.

5. The method of claim 4, wherein an anaglyph is formed from said left eye view image and said right eye view image comprising:
    (i) assigning each pixel in said left eye view image a single hue;
    (ii) assigning each pixel in said right eye view image a single hue which is orthogonal to said single hue assigned to each pixel in said left eye view image; and
    (iii) assigning each pixel in said anaglyph the sum of the red, blue, and green values present in each corresponding pixel from both the left eye view image and the right eye view image.

6. The method of claim 2, wherein said left eye view images and said right eye view images are displayed on a surface in a manner comprising continuously repeating in an alternating fashion:
    displaying said left eye view image on the surface in a manner so as to be perceivable by only the viewer's left eye; and
    displaying said right eye view image on the surface in rapid succession with said displaying of said left eye view image in a manner so as to be perceivable by only the viewer's right eye.

7. The method of claim 2, wherein each of said left eye view images is comprised of multiple separate left eye view images and each of said right eye view images is comprised of multiple separate right eye view images combined in a manner comprising the steps of:
    (a) computing multiple separate said left and right eye view images each covering an area which intersects in whole or in part with that of at least one other separate said left or right view image;
    (b) assigning a multiplier between 0 and 1 to each separate said left or right eye view image corresponding to the desired opacity of each separate said view image;
    (c) applying the corresponding multiplier to each pixel of each of said separate view images; and
    (d) adding each corresponding pixel value from each separate left or right view image to form one each of final said left and right eye view images.

8. The method of claim 7, wherein each of said left and right view images are perceived as consisting of multiple layers of three-dimensional images, each of said layers being partially, fully, or not at all transparent with respect to other said layers of three-dimensional images.

9. The method of claim 2, wherein each row of the right eye view image is created by projecting a single row of said digital image data in conjunction with a single row of said digital elevation-data while proceeding from left to right across said row of digital elevation data.

10. The method of claim 9, wherein each row of the left eye view image is created by projecting a single row of said digital image data in conjunction with a single row of said digital elevation data while proceeding from right to left across said row of digital elevation data.

11. The method of claim 2, wherein said digital elevation data is comprised of at least two values which differ in magnitude.

12. An anaglyph of an image, said anaglyph comprising a plurality of a anaglyph pixels, each of said anaglyph pixels having an intensity of a first hue and an intensity of an orthogonal second hue wherein:

when viewed with apparatus which admits the first hue only to a viewer's right eye and admits the second hue only to the viewer's left eye, the image is perceived to be three-dimensional with each pixel in the image projected from an associated vantage point unique to such pixel.

13. The anaglyph of claim 12 wherein each said vantage point is located directly above the associated pixel at a uniform height.

14. A method for preparing an anaglyph as a combination of left and right eye views combining digital image data defining image pixels with corresponding digital elevation data defining different elevations associated with respective ones of said image pixels, said left and right eye views when viewed with the left and right eyes, respectively, producing the sensation of binocular three-dimensionality, comprising the steps of:

for each of a first plurality of said image pixels, computing a projected position in the left eye view, said projected position being computed based upon the associated elevation, a view point directly above such pixel with a given eye separation, and a given height above an image plane;

for each of a second plurality of said image pixels, at least partially coincident with said first plurality, computing a projected position in the right eye view, said projected position being computed based upon the associated elevation, a view point directly above such pixel, said given eye separation, and said given height above said image plane; and combining said left and right eye views to produce the anaglyph.

15. The method of claim 14 further comprising:

selecting said given height; and determining whether any pixels in said digital image data are subject to an occlusion.

16. A anaglyph being a composite of left and right eye views of an image of an area having a plurality of different elevations, wherein:

the left eye view comprises, for each of a fast plurality of pixels of said image, a projection of such pixel computed based upon an associated elevation, a view point directly above such pixel wit a given eye separation, and a given height above an image plane; and the right eye view comprises, for each of a second plurality of pixels of said image, at least partially coincident with said first plurality of pixels, a projection of such pixel computed based upon an associated elevation, a view point directly above such pixel, said given eye separation, and said given height above said image plane.

* * * * *